United States Patent [19]
Persson et al.

[11] Patent Number: 6,028,851
[45] Date of Patent: Feb. 22, 2000

[54] SYSTEM AND METHOD FOR MOBILE ASSISTED ADMISSION CONTROL

[75] Inventors: Anders Håkan Persson; Per Hans Åke Willars, both of Stockholm; Robert Alexandersson, Upplands Väsby, all of Sweden

[73] Assignee: Telefonaktiebolaget L M Ericsson (publ), Stockholm, Sweden

[21] Appl. No.: 08/939,056

[22] Filed: Sep. 26, 1997

[51] Int. Cl.[7] .............................. H04B 7/216; H04J 3/16
[52] U.S. Cl. ...................... 370/329; 370/335; 370/468; 375/200
[58] Field of Search ..................... 370/335, 342, 370/329, 336, 465, 468, 225, 229, 230, 231, 232, 233, 234, 325, 252, 253, 441, 479; 375/200

[56] References Cited

U.S. PATENT DOCUMENTS

| | | | |
|---|---|---|---|
| 4,910,794 | 3/1990 | Mahany | 455/67 |
| 5,038,399 | 8/1991 | Bruckert | 455/33 |
| 5,103,460 | 4/1992 | Stewart | 375/1 |
| 5,132,966 | 7/1992 | Hayano et al. | 370/79 |
| 5,245,629 | 9/1993 | Hall | 375/1 |
| 5,278,992 | 1/1994 | Su et al. | 455/69 |
| 5,287,544 | 2/1994 | Menich et al. | 455/33.1 |
| 5,327,576 | 7/1994 | Uddenfeldt et al. | 455/33.2 |
| 5,345,596 | 9/1994 | Buchenhorner et al. | 455/33.1 |
| 5,345,598 | 9/1994 | Dent | 455/54.1 |
| 5,363,404 | 11/1994 | Kotzin et al. | 375/1 |
| 5,365,543 | 11/1994 | Takahashi et al. | 375/1 |
| 5,377,183 | 12/1994 | Dent | 370/18 |
| 5,394,435 | 2/1995 | Weerackody | 375/206 |
| 5,426,666 | 6/1995 | Kato | 375/200 |
| 5,430,760 | 7/1995 | Dent | 375/200 |
| 5,430,761 | 7/1995 | Bruckert et al. | 375/200 |
| 5,475,861 | 12/1995 | Hall | 455/33.1 |
| 5,491,717 | 2/1996 | Hall | 375/205 |
| 5,497,504 | 3/1996 | Acampora et al. | 455/33.2 |
| 5,511,073 | 4/1996 | Padovani et al. | 370/82 |
| 5,539,728 | 7/1996 | Gaiani et al. | 370/18 |
| 5,541,997 | 7/1996 | Pappas et al. | 380/49 |
| 5,564,075 | 10/1996 | Gourgue | 455/69 |
| 5,774,455 | 6/1998 | Kawase et al. | 370/232 |
| 5,808,581 | 9/1998 | Uchida et al. | 370/35 |
| 5,917,811 | 6/1999 | Weaver, Jr. et al. | 370/332 |
| 5,920,545 | 7/1999 | Rasanen et al. | 370/332 |

FOREIGN PATENT DOCUMENTS

WO 95 35002  12/1995  WIPO .
WO 98 30057  7/1998  WIPO .

*Primary Examiner*—Douglas W. Olms
*Assistant Examiner*—Ali A Zamani
*Attorney, Agent, or Firm*—Jenkens & Gilchrist, P.C.

[57] ABSTRACT

A system for inhibiting the transmission of an access request message from a mobile station when either the system is incapable of granting access at the class of service desired by the mobile or access by the mobile at that class of service would increase the interference level of the target base station or a neighboring base station past its interference capacity. In one embodiment, each base station broadcasts a maximum data rate access parameter and any mobile receiving that parameter and seeking access at a greater data rate refrains from transmitting an access request message. In another embodiment, each mobile calculates from its path loss to the base station the power level it must transmit in order to gain access as well as the effect of that transmission on the interference level of both the target base station and neighboring base stations. If transmission at the required power level would increase the interference level of any base station past its maximum capacity, the transmission is inhibited. The system is most effective in CDMA mobile cellular radio systems.

16 Claims, 3 Drawing Sheets

SYSTEM AND METHOD FOR MOBILE ASSISTED ADMISSION CONTROL

BACKGROUND OF THE INVENTION

1. Field of the Invention

The present invention relates to mobile radio communication systems and, more particularly, to a method and system for minimizing interference produced by mobile radio stations initiating communications with fixed radio stations.

2. Description of the Related Art

In cellular radio telecommunications networks, a mobile radio subscriber station can initiate a telephone call to a base station at any time through a process known as random access call set-up. The random access procedure applies not only to initiation of a call by the mobile station but also the mobile station's first transmission of a reply to a paging signal from the mobile station's currently associated base station. In each of these situations, the amount of power with which the mobile station transmits an initial access message to the base station can have a strong effect upon the overall quality of the communication between the base station and other mobile stations.

Two main techniques of modulation have been used in cellular radio telecommunication systems: analog and digital. Among the former, frequency division multiple access (FDMA) has historically been the most common way in which multiple call connections are handled between many mobiles and a single base station. In FDMA, the available radio frequency spectrum is divided into a plurality of channels. A separate and distinct frequency channel is assigned to each mobile station and that channel is occupied continuously throughout the length of its connection to that base station. More recently, digital modulation techniques have been introduced to increase the efficiency of spectrum utilization in cellular systems. The principal digital modulation methods employed are time division multiple access (TDMA) and code division multiple access (CDMA). In the TDMA technique different ones of the mobile stations are allocated a separate short time slot in a periodically repeating frame of information during which they transmit bursts of digitized data containing both speech and control information. Thus, several separate mobile stations time-share a single frequency channel previously occupied by a single mobile station and thereby increase the efficiency with which the available radio frequency spectrum is used. In the CDMA technique the speech and information signals from a plurality of mobile stations are each separately encoded with a different spread-spectrum pseudo-noise (PN) chip code that distinguishes its signal from that of the other mobiles. All of the PN encoded signals are then transmitted through spread-spectrum transmission over the same relatively broad frequency band. While all of the PN encoded signals overlap each other in both time and frequency they are decoded by correlation with the PN code associated with the desired speech/information signal of a particular mobile station.

Because mobile stations move freely within each of the cells of a cellular telecommunications system, the physical distance between each one of the mobile stations and its associated base station can vary significantly. Since the radio signal propagation loss between a transmitter and a receiver increases typically as a function of the fourth power of the distance between them, very large differences usually arise in the strength of the signals received at the base station from different ones of the mobile stations. There are numerous techniques for reducing the interference between the different signals of the respective mobile stations. Nevertheless interference is present as a result of the great disparity in distances between each of the mobile stations and their common base station and, thus, the great differences between the signal strengths of the various mobiles.

The power regulation problem associated with mobile stations is greatly exasperated in the case of CDMA systems where a mobile station receiving with twice the power of another mobile station occupies twice the system capacity of that station (assuming the mobile stations have the same perceived path loss). In addition, a mobile station transmitting at a higher data rate than another mobile station also occupies a greater portion of the system resources than that mobile station. While regulation of the power with which mobile stations transmit in general is extremely important in CDMA systems, the regulation of power with which a mobile station seeks initial access to a base station is especially critical.

As illustrated in FIG. 1, a conventional technique used by a mobile station seeking access to a base station in a radio telecommunications system is that of gradually increasing the power level at which an access request message is sent to the base station until an acknowledgment message from the base station is received back at the mobile. That is, an initial access message is first transmitted at a preselected power level and then if no acknowledgment is received from the base station, the mobile station repeats the access request message a few milliseconds later at a slightly higher power level. It continues gradually increasing the power of its transmissions until an acknowledgment of receipt of the access message from the base station is received by the mobile. The power at which access is actually granted to the mobile station will be at some value greater than the actual power which was necessary to achieve communication. This degree of "overshoot" is a function of the rapidness with which the transmission power of the mobile station is increased i.e., the faster the power is increased the greater the overshoot.

If access is never granted by the base station, e.g., due to lack of system capacity or necessary hardware resources, a mobile will increase its power level to its maximum before it gives up. Thereafter it may recycle and start the process over again. If many mobile stations are futility seeking access to the system and each mobile is transmitting an access request message at increasingly higher power levels, this can result in serious degradation of system resources, especially in CDMA systems.

Certain techniques have been proposed for the initial determination of an appropriate power with which to initiate access by a mobile station to a base station. For example, in U.S. Pat. No. 5,278,992, the mobile station performs a calculation based upon monitored transmission power and received signal level of the base station. However, such a technique cannot prevent attempted accesses by a mobile station which would ultimately be unsuccessful. They still result in the addition of an increase in the level of interference within the system and a consequent degradation of system performance.

Thus, there is a need for a technique of inhibiting access attempts by a mobile station which will either be unsuccessful or which will result in an inordinate degree of interference and degradation of system performance.

BRIEF SUMMARY OF THE INVENTION

In one aspect the invention preserves the quality of service within a digital radio telecommunications system by broadcasting from a base station within the network a maximum data rate access parameter value representing the maximum data rate at which additional accesses can be granted to the network by the base station without an unacceptable degradation of service within the network. The maximum data rate access parameter is received at a mobile station desiring access to the network and compared to the data rate at which access to the network is desired by the mobile station. If the access desired by said mobile is at a data rate greater than the value of the maximum data rate access parameter value the transmission of an access request signal from the mobile station is inhibited.

In another aspect, the present invention includes controlling access to a cellular radio telecommunications system by a mobile station seeking access to a base station at a given quality of service having an associated signal-to-interference ratio (SIR) value. The base station regularly broadcasts parameter values indicating the power with which it is then transmitting to mobile stations, the total interference currently present at the base station (Itot), and the maximum interference (Imax) the base station can allow.

The mobile station receives each of the power, total interference and maximum interference parameter values broadcast by the base station. The mobile station measures the value of the signal received from the base station and calculates the path loss as the difference between the broadcast power of the base station and the value of its signal received at the mobile station. The mobile station also calculates from the path loss the power value with which the mobile station would need to transmit to the base station in order to be received at a signal value having an adequate SIR value for the quality of service being desired by the mobile station. A new total interference value is calculated for the base station at the mobile station based upon the mobile station beginning transmission at the calculated power value. The mobile station then determines whether or not the new total power value at the base station exceeds the maximum power value which the base station can allow and inhibits the transmission of an access request message signal from the mobile station if the new calculated total value of power at the base station exceeds that maximum power value.

In a further aspect, the present invention includes a plurality of other base stations neighboring the target base station to which the mobile station seeks access, the current transmission power, Itot and Imax values of which neighboring base stations are broadcast. The mobile station additionally calculates from the path loss the power value with which the mobile station would need to transmit to the target base station to which it seeks access in order to be received at a signal value having an adequate SIR value for the quality of service being desired by the mobile station. The mobile station then calculates the path loss to each neighboring base station (e.g., based on measured signal strength and broadcasted transmission power information). From this the mobile station calculates a new total interference value at each of the other plurality of base stations neighboring the base station to which the mobile station seeks access if the mobile station begins transmission at the calculated power value. If the new total power value at each of the other plurality of neighboring base stations exceeds the maximum power value which each of the neighboring base stations can allow the mobile station inhibits the transmission of an access request message signal to the base station to which it seeks access.

BRIEF DESCRIPTION OF THE DRAWINGS

For an understanding of the present invention and for further objects and advantages thereof, reference can now be had to the following description, taken in conjunction with the accompanying drawings in which.

DETAILED DESCRIPTION OF THE PREFERRED EMBODIMENT

In cellular mobile telecommunication systems there is a limited amount of system capacity available within each cell. For example, in a CDMA cellular radio telecommunication system, each base station has a finite capacity of total received in-band power (the sum total of power being received at the base station from each of the mobiles with which the base station is in communication plus the power received at the base station from mobiles being served by base stations in adjacent cells) with which it can cope and still receive signals from mobiles located on the outer periphery of its cell. Each mobile station contributes to the overall interference level within the cell by a value proportional to the power with which that mobile station is transmitting a signal to the base station as well as the data rate with which its signal is transmitted. Because the attenuation of a signal traveling through the atmosphere from a transmitter to a receiver is a function of the fourth power of the distance between the two, receivers farther from a base station must transmit at a significantly higher power than those nearer the base station in order to be received at the base station at a given signal quality.

Each time a mobile station seeks access from a base station, either initial access or in response to a page from the base station, it must transmit at an initial power level which it anticipates is sufficient be received at the base station at a given signal quality. The signal transmitted by a mobile station seeking access to the network consists of an initial access request message transmitted at a relatively low power level. If the mobile station does not receive an acknowledgment signal from the base station indicating that it has received the mobile's access request, the mobile will retransmit the signal at a slightly higher power level. If an acknowledgment is still not received from the base station, the cycle is repeated with increasing power level for each transmission until acknowledgment is received. Each one of the increasingly more powerful transmissions from the mobile station increases the interference level within the cell and thereby incrementally degrades the quality of the service rendered to all of the other mobile stations in the cell by the base station.

Figure 1:
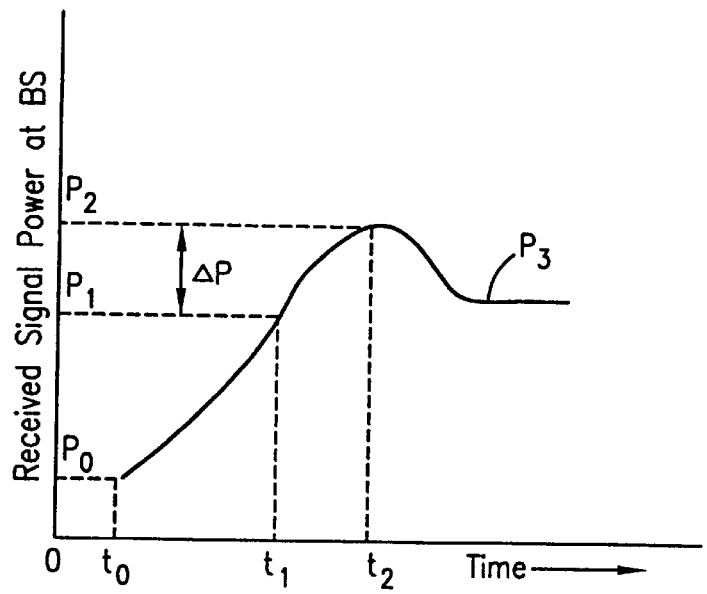
FIG. 1 is a graph illustrating the ramping of power by a mobile station seeking access to a base station in accordance with prior art techniques.

Referring to FIG. 1, there is shown a graph indicating a traditional closed loop power control method of accessing a base station by a mobile station in a cellular system. At $t_0$ the mobile station begins transmitting an access request signal toward the base station at an initial power $P_0$. If an access acknowledgment from the base station is not received by the mobile station it continues increasing the power until time $t_1$ at which a power level $P_1$ has been reached and at which time the base station detects the signal containing the access request message from the mobile station, runs its access control algorithm and determines that access to the requesting mobile should be allowed. However, by the time the base station can process the access request from the mobile station and reply back to it that the access request has been received and granted, the mobile station has continued to increase the power until at $t_2$ its power has reached a relatively larger value of $P_2$. Thereafter, the base station instructs the mobile station to decrease its power level to value $P_3$, which is the minimum value necessary to maintain a desired level of communication quality between the mobile station and base station. The time period between $t_1$ and $t_2$ results in a large additional increment of unnecessary power $\Delta P$ being injected into the cell by the mobile station. This additional power injection consumes valuable system resources and results in significant degradation of the quality of service which the base station can render to all the other mobiles in the system.

In addition, it may happen that after a mobile station attempts access to the base station and incrementally increases its power to its maximum value it still may not get access. Access can be denied for many reasons including lack of system resources at the base station (the system is at maximum capacity) or lack of specific hardware resources at the base station, to provide the service being requested by the mobile. Nevertheless, a mobile station may continue to cyclically reattempt to obtain access to the base station by ramping up the power with which an access request message is transmitted toward the base station over and over. This pattern being repeated by multiple mobile stations seeking access can significantly degrade the quality of service within a given cell.

It should be understood that there are other techniques by which a mobile station seeks access to the system other than the power ramping procedure described above in connection with FIG. 1. For example, the slotted Aloha method is one whereby a mobile station transmits an initial access request message at a relatively high power and then retransmits it if an acknowledgment from the base station is not received. In either case, the power injected into the system by the mobile consumes valuable system resources.

As pointed out above, the quality of service being requested by the mobile station (i.e., the data rate with which it desires to obtain access to the base station) also affects the level of interference in the system. That is, if a low data rate speech connection is sought, such connection would require less power to maintain than a high data rate packet connection to the base station. The maximum data rate depends on the quality of service required (i.e., bit error rate, delay), so different maximum data rates may depend on the different quality of service levels required. Thus, whether or not access by a mobile station to the base station is allowed may be a function of the type of connection which is being requested by the base station. If a mobile station knows whether or not the base station currently has the capacity to allow an access by an additional mobile station at a given data rate, it can avoid a futile cyclic ramp up of its power and a resultant system resource degradation.

Figure 2:
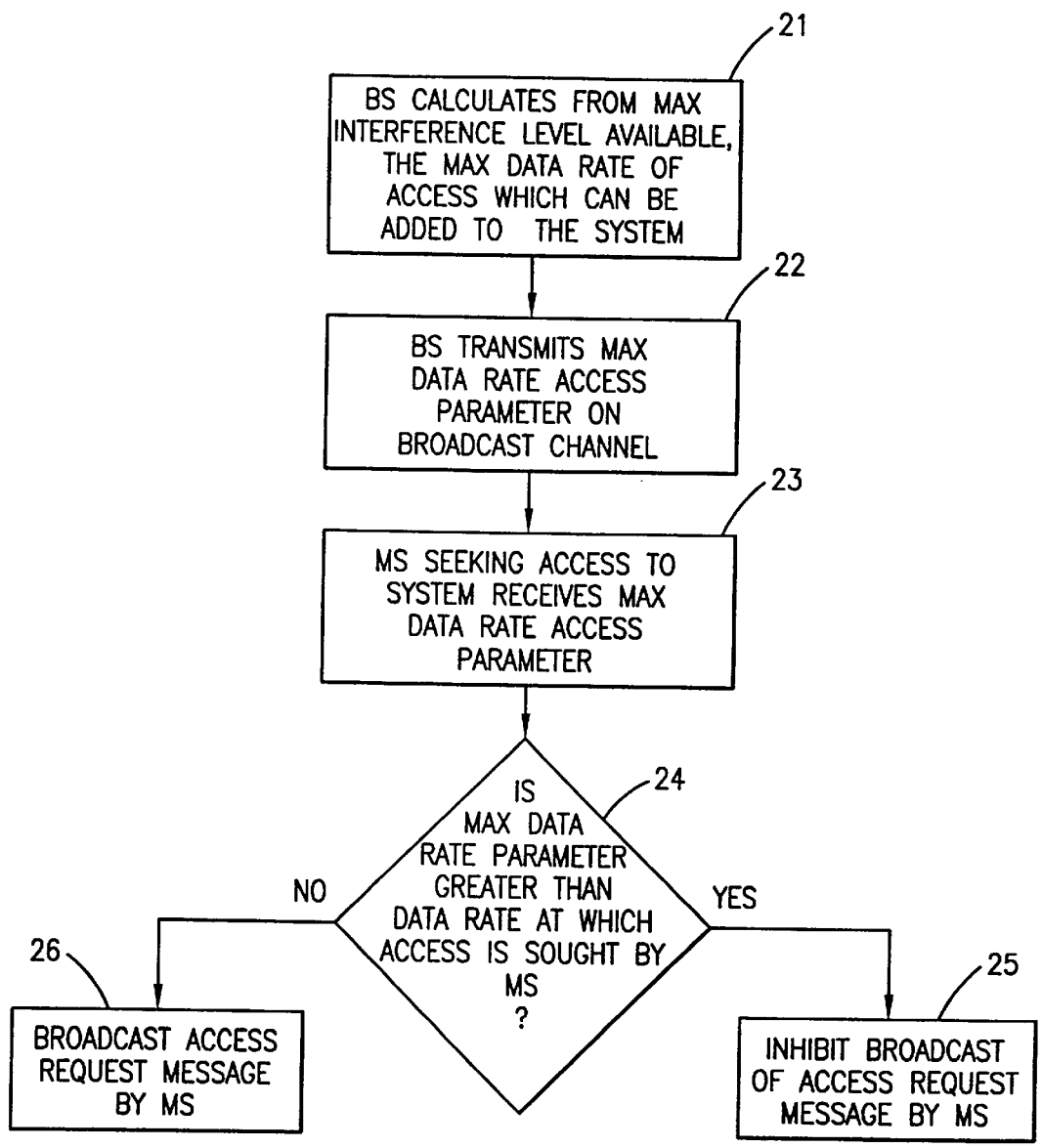
FIG. 2 is a flow chart illustrating a procedure for mobile access control within a mobile telecommunication system in accordance with one aspect of the present invention.

Thus, in one aspect of the present invention, as illustrated in the flow chart of FIG. 2, a base station regularly calculates from its remaining capacity a maximum data rate access parameter at 21 and, at 22, transmits that parameter channel on the broadcast channel received by all the mobiles within its area. This parameter indicates the maximum data rate at which additional service can at that time be granted by the base station. Each mobile station within the area of the base station receives at 23 this broadcast maximum data rate access parameter and if, based upon a comparison at 24, it is seeking access at a data rate greater than that indicated to be the maximum allowed by the base station, it does not seek access at all at 25. Based upon the comparison at 24, if the maximum data rate access parameter being broadcast by the system is greater than the data rate for which access is being sought by the mobile, it seeks access from the base station at 26. Once that access has been granted, the base station recalculates the maximum data rate at which still additional access can be granted and modifies the parameter being broadcast to conform to the new value. This procedure eliminates the injection of needless interference into the system by mobiles seeking access to the system when the base station does not presently have the capacity to allow that access.

In another aspect of the present invention, the mobile station itself evaluates the effect of its achieving access to the base station and the degree of degradation of system quality as a result of that access.

Figure 3:
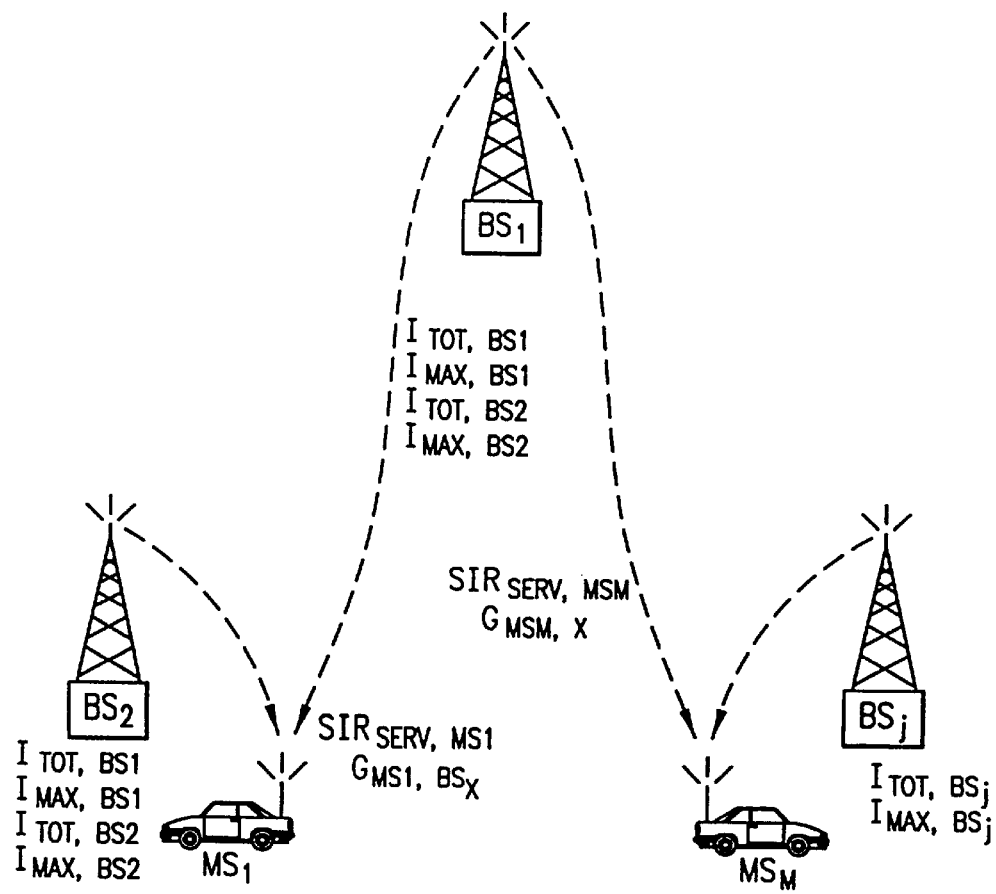
FIG. 3 is a block diagram illustrating a technique of mobile access control within a radio telecommunications system in accordance with the present invention.

Referring next to FIG. 3, there is shown three illustrative base stations $BS_1$, $BS_2$ ... $BS_j$ serving a pair of mobile stations $MS_1$ ... $MS_m$. Mobile station $MS_1$ is connected to base station $BS_2$ and has a certain value of SIR. Depending upon the quality of service required, the mobile station knows what SIR must be maintained in order to continue communication (e.g., the SIR depends on the radio channel propagation path involved). The mobile station $MS_1$ can also measure the path loss on the downlink of the signal from $BS_2$ to $MS_1$. This is determined knowing the output power from $BS_2$ (which is periodically broadcast as a parameter by the base station) and measuring the value of the signal from $BS_2$ received at $MS_1$. The difference between the two is the path loss on the downlink. It can be reasonably assumed that the path loss on the uplink from $MS_1$ to $BS_2$ will be the same. Therefore, the mobile station $MS_1$ knows with what power it must transmit in order to have its signal received at the base station $BS_2$ at a given signal value since it knows what the path loss on the signal will be as well as the SIR desired at the base station. In addition, the base station $BS_2$ periodically transmits a parameter indicating the total interference value ($I_{tot}$) that it has at the moment. $I_{tot}$ is the total power in a given frequency band, i.e., the sum of the power of all the users communicating with that base station at that moment plus the sum of all interference from all other mobiles in the system at that moment. This value $I_{tot,BS1}$ may be regularly broadcast not only by base station $BS_1$ but also by all of the neighboring base stations in the area, $BS_2$ ... $BS_j$. Similarly each base station (including serving base stations) may broadcast an $I_{tot,BS2}$ and an $I_{tot,BSj}$ so that each mobile in the area may receive the total interference value, $I_{tot}$ for not only its serving base station but also for each of the neighboring base stations.

Similarly, base station $BS_1$ also periodically broadcasts a value $I_{max,BS1}$ which is the maximum value of interference with which that base station is capable of dealing and still receiving a signal from a mobile station on the outer edges of the cell boundary. Similarly, each base station (including serving base stations) may also broadcast the $I_{max}$ for each of the neighboring base stations in the region as well.

Each mobile station has an established SIR for the type of service it wants to have, designated as $SIR_{serv,ms1}$ for the quality of service desired by mobile station $MS_1$. As mentioned above, each mobile station also knows the path loss for its communication with both its serving base station as well as any of the neighboring base stations, designated by $G_{ms1,BSx}$ for mobile station $MS_1$ and any of the neighboring base stations. Similarly, data is being transmitted by each of the other base stations and quality of service determinations and path loss are known by each of the other mobile stations such as $Ms_m$.

Each mobile station knows that the service which it would it like to initiate with a base station requires a certain SIR and it can calculate the path loss from each of the base stations that it is near. This is done by knowing the power with which the base station is transmitting (a parameter regularly transmitted by the base station) and measuring the power with which that signal is received, the difference in decibels being the path loss. Thus, a mobile station knowing the $I_{tot,bs1}$ can calculate with what power it must transmit to each base station in order to have its signal received at that base station for a given SIR. The SIR and $I_{tot,bs1}$ provide the required received power, which together with the path loss, gives the required transmit power. Given that required transmitting power by the mobile station and the current interference being experienced by that base station ($I_{tot,bs1}$) a mobile station can calculate a new value of total interference which would be present at that base station if it transmits at the required transmitting power necessary to receive the services it then desires. If the new total interference at that base station ($I_{tot,bs1}$) is greater than the maximum total interference ($I_{max,bs1}$) with which the base station can cope, the mobile station inhibits the transmission of an access signal. Otherwise, if the mobile station were to go ahead and seek access at the power level required to obtain the type of service it was desiring, it would push the interference level of the base station past its maximum allowable value and seriously decrease the quality of the other users of the system connected to that base station.

Similarly, the system can be selectively enabled to perform not only the calculations within the mobile station with respect to its effect of transmitting an access signal on its then serving base station but also the effect on transmitting that access signal on each of its neighboring base stations. Since the mobile station may receive the $I_{tot}$ and $I_{max}$ data for each of the neighboring base stations from the serving base station or from the neighboring base stations as well as the transmitted signal value and measurement of the received signal value, it can similarly calculate the effect that transmission of an access signal having a power level of the value it would need to transmit in order to achieve access would have upon each of the neighboring base stations as well. Thus, the mobile station may inhibit transmission of an access request signal based not only upon a degradation of the quality of service at its own base station but may also inhibit transmission based upon its effect upon the quality of service at neighboring base stations.

Figure 4:
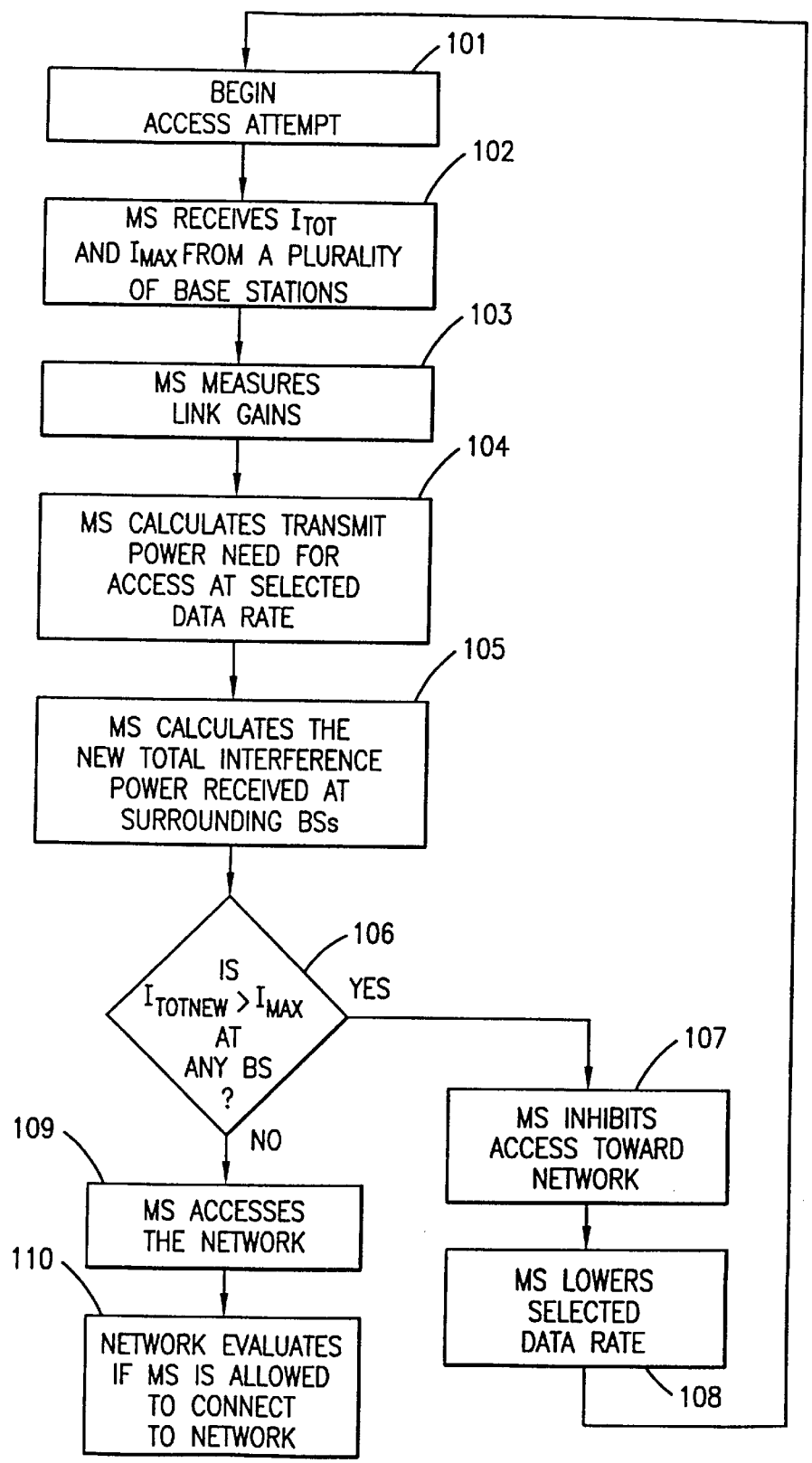
FIG. 4 is a flow chart illustrating a procedure for mobile access control within a mobile telecommunications system in accordance with another aspect of the present invention.

Referring next to FIG. 4, there is shown a flow chart depicting the sequence of steps employed in implementing a method in accordance with one aspect of the present invention. At 101, a mobile station begins an access attempt and at 102 the mobile station receives the $I_{tot}$ and $I_{max}$ for each of a plurality of neighboring base stations from the serving base stations or from each of the neighboring base stations. At 103 the mobile station measures the path loss to the base station with which it desires access as well as to the neighboring base stations thereto. At 104 the mobile station calculates the transmitting power needed for access to each base station at a selected data rate and therefore a given quality of service having a given SIR value. At 105 the mobile calculates the new total interference power ($I_{totnew}$) received at each of the surrounding base stations if it were to transmit at the calculated necessary transmit power to achieve access at a given data rate.

At 106 the mobile station evaluates whether or not the new $I_{totnew}$ is greater than $I_{max}$ for each of the given base stations. If yes, the mobile station inhibits access toward the network at 107. It may at 108 lower the selected data rate with which it seeks access and return to 101 to attempt to recalculate the consequences of its access at a lower data rate. If, however, at 106, the new $I_{totnew}$ was not greater than the $I_{max}$ for the given base station, the mobile station moves to 109 and transmits an access request to the network at the calculated transmit power level necessary to achieve access for given quality of service it desires. Finally, at 110 the network evaluates the request by the mobile station for access and determines whether or not all of the other necessary criteria are available in the network to grant the mobile station access at the given type of service it has requested.

As can be seen, the system of the present invention greatly enhances the quality of service to each of the subscribers within the network. It inhibits the mobile station from seeking access to the network if such an access attempt would be either unacceptable to the overall quality of service being delivered by the network to the other mobiles or if the access would degrade service to the mobiles by the network to such a degree that access by that mobile for that quality of service sought is undesirable.

Although preferred embodiments of the method and apparatus of the present invention have been illustrated in the accompanying drawings and described in the foregoing description, it is understood that the invention is not limited to the embodiment(s) disclosed but it capable of numerous rearrangements, modifications and substitutions without departing from the spirit of the invention as set forth and defined in the following claims.

What is claimed is:

1. A method of preserving the quality of service within a digital radio telecommunications system comprising the steps of:

broadcasting from a base station within the network a maximum data rate access parameter value representing the maximum data rate at which additional accesses can be granted to the network by the base station without an unacceptable degradation of service within the network; and receiving said broadcast maximum data rate access parameter at a mobile station desiring access to the network;

comparing within the mobile station the value of the maximum data rate access parameter to the data rate at which access to the network is desired by the mobile station; and inhibiting the transmission of an access request signal from the mobile station if the access desired by said mobile is at a data rate greater than the value of the maximum data rate access parameter value.

2. A method as set forth in claim 1 which includes the additional step of:

recalculating the value of said maximum data rate access parameter within said base station in response to each additional successful access to the network by a mobile station.

3. The method as set forth in claim 1 in which said maximum data rate access parameter value indicates that there is no limitation on the data rate with which the system may be accessed by a mobile.

4. The method as set forth in claim 1 wherein the digital radio telecommunication system is a CDMA system.

5. A system for preserving the quality of service within a digital radio telecommunications system comprising the steps of:

means for broadcasting from a base station within the network a maximum data rate access parameter value representing the maximum data rate at which additional accesses can be granted to the network by the base station without an unacceptable degradation of service within the network; and means for receiving said broadcast maximum data rate access parameter at a mobile station desiring access to the network;

means for comparing within the mobile station the value of the maximum data rate access parameter to the data rate at which access to the network is desired by the mobile station; and means for inhibiting the transmission of an access request signal from the mobile station if the access desired by said mobile is at a data rate greater than the value of the maximum data rate access parameter value.

6. A system as set forth in claim 5 which also includes:

means for recalculating the value of said maximum data rate access parameter within said base station in response to each additional successful access to the network by a mobile station.

7. The system as set forth in claim 5 in which said maximum data rate access parameter value indicates that there is no limitation on the data rate with which the system may be accessed by a mobile.

8. The system as set forth in claim 5 wherein the digital radio telecommunication system is a CDMA system.

9. A method for controlling access to a cellular radio telecommunications system by a mobile station seeking access to a base station at a given quality of service and data rate having an associated SIR value and in which a base station regularly broadcasts parameter values indicating the power with which it is then transmitting to mobile stations, the total interference currently present at the base station ($I_{tot}$), and the maximum interference ($I_{max}$) the base station can allow, said method comprising:

receiving at said mobile station each of said broadcast power, total interference and maximum interference parameter values broadcast by said base station;

measuring within said mobile station the value of the signal received from said base station and calculating the path loss as the difference in dB between the broadcast power of the base station and the value of its signal received at said mobile station;

calculating within the mobile station from said path loss the power value with which the mobile station would need to transmit to the base station in order to be received at a signal value having an adequate SIR value for the quality of service being desired by the mobile station;

calculating within the mobile station a new total interference value at the base station if the mobile station begins transmission at the calculated power value;

determining whether or not the new total power value at the base station exceeds the maximum interference value with which the base station can allow; and inhibiting the transmission of an access request message signal from the mobile station to the base station if the new calculated total value of interference at the base station exceeds the maximum interference value which the base station can allow.

10. A method as set forth in claim 9 wherein the system includes a plurality of other base stations neighboring said base station to which said mobile station seeks access, each of which neighboring base stations broadcasts its current transmission power, its $I_{tot}$ and its $I_{max}$ values and wherein the mobile station performs the following additional steps:

calculating within the mobile station from said path loss the power value with which the mobile station would need to transmit to said base station to which it seeks access in order to be received at a signal value having an adequate SIR value for the quality of service being desired by the mobile station;

calculating within the mobile station a new total interference value at each of the other plurality of base stations neighboring said base station to which said mobile station seeks access if said mobile station begins transmission at the calculated power value;

determining whether or not the new total interference value at each of said other plurality of neighboring base stations exceeds the maximum interference value which each of said neighboring base stations can allow; and inhibiting the transmission of an access request message signal from the mobile station to said base station to which it seeks access if the new calculated total value of interference at any one of said other plurality of neighboring base stations exceeds the maximum power interference which that base station can allow.

11. A method as set forth in claim 9 wherein said mobile station, in response to an inhibiting of the transmission of its access request message, performs the additional steps of:

assuming a lower quality of service for the access which said mobile station desires from the system; and recalculating each of said values for the lower quality of service to determine if access can be allowed to the system.

12. A method as set forth in claim 9 wherein said cellular radio communication system is a CDMA system.

13. A system for controlling access to a cellular radio telecommunications system by a mobile station seeking access to a base station at a given quality of service having an associated SIR value and in which a base station regularly broadcasts parameter values indicating the power with which it is then transmitting to mobile stations, the total interference currently present at the base station ($I_{tot}$), and the maximum interference ($I_{max}$) the base station can allow, said system comprising:

means for receiving at said mobile station each of said broadcast power, total interference and maximum interference parameter values broadcast by said base station;

means for measuring within said mobile station the value of the signal received from said base station and calculating the path loss as the difference between the broadcast power of the base station and the value of its signal received at said mobile station;

means for calculating within the mobile station from said path loss the power value with which the mobile station would need to transmit to the base station in order to be received at a signal value having an adequate SIR value for the quality of service being desired by the mobile station;

means for calculating within the mobile station a new total interference value at the base station if the mobile station begins transmission at the calculated power value;

means for determining whether or not the new total interference value at the base station exceeds the maximum interference value with which the base station can allow; and means for inhibiting the transmission of an access request message signal from the mobile station to the base station if the new calculated total value of interference at the base station exceeds the maximum interference value which the base station can allow.

14. A system as set forth claim 13 wherein the system includes a plurality of other base stations neighboring said base station to which said mobile station seeks access, the current transmission power, $i_{tot}$ and $I_{max}$ values of which neighboring base stations are also broadcast, and wherein the mobile station also includes:

means for calculating within the mobile station from said path loss the power value with which the mobile station would need to transmit to said base station to which it seeks access in order to be received at a signal value having an adequate SIR value for the quality of service being desired by the mobile station;

means for calculating within the mobile station a new total interference value at each of the other plurality of base stations neighboring said base station to which said mobile station seeks access if said mobile station begins transmission at the calculated power value;

means for determining whether or not the new total interference value at each of said other plurality of neighboring base stations exceeds the maximum interference value which each of said neighboring base stations can allow; and means for inhibiting the transmission of an access request message signal from the mobile station to said base station to which it seeks access if the new calculated total value of interference at any one of said other plurality of neighboring base stations exceeds the maximum interference value which that base station can allow.

15. A method as set forth in claim 13 wherein said mobile station also includes:

means responsive to the inhibiting of access to the system for assuming a lower quality of service for the access which said mobile station desires from the system; and means for recalculating each of said values for the lower quality of service to determine if access can be allowed to the system.

16. A method as set forth in claim 13 wherein said cellular radio communication system is a CDMA system.

* * * * *